US006184522B1

(12) United States Patent
Jolliffe

(10) Patent No.: US 6,184,522 B1
(45) Date of Patent: Feb. 6, 2001

(54) ION SOURCE

(75) Inventor: Charles Jolliffe, Schomberg (CA)

(73) Assignee: MDS Inc., Etobicoke (CA)

( * ) Notice: Under 35 U.S.C. 154(b), the term of this patent shall be extended for 0 days.

(21) Appl. No.: 09/136,312

(22) Filed: Aug. 19, 1998

Related U.S. Application Data

(60) Provisional application No. 60/056,866, filed on Aug. 22, 1997.

(51) Int. Cl.[7] .............................. H01J 49/00; B01D 54/44

(52) U.S. Cl. ......................................... 250/288; 250/423 P

(58) Field of Search .................................... 250/281, 288, 250/423 P

(56) References Cited

U.S. PATENT DOCUMENTS

| | | | |
|---|---|---|---|
| 4,178,507 | * 12/1979 | Brunnee et al. | 250/288 |
| 4,740,298 | * 4/1988 | Andresen et al. | 250/288 |
| 4,988,879 | * 1/1991 | Zare et al. | 250/423 P |
| 5,288,644 | * 2/1994 | Beavis et al. | 250/282 |
| 5,567,935 | * 10/1996 | Fajardo et al. | 250/423 P |

* cited by examiner

*Primary Examiner*—Bruce C. Anderson
(74) *Attorney, Agent, or Firm*—Bereskin & Parr

(57) ABSTRACT

An ion source having a capillary for spraying analyte to form ions, which are charged and attracted to the edge of an insulating film on a spinning disk having a metal core. The disk carries the ions through a slot into a vacuum chamber where they are removed, resulting in continuous transfer of the ions into the vacuum chamber while greatly reducing the amount of gas which enters the vacuum chamber.

3 Claims, 4 Drawing Sheets

ION SOURCE

PRIOR APPLICATION

This application claims the benefit of Provisional Application Serial No. 60/056,866 filed Aug. 22, 1997 entitled QUADRUPOLE TIME-OF-FLIGHT MASS SPECTROMETER METHOD AND APPARATUS.

FIELD OF THE INVENTION

This invention relates to an ion source for creating ions outside a vacuum chamber and for moving the ions into a vacuum chamber.

BACKGROUND OF THE INVENTION

Various kinds of ion sources have been used in the past to produce ions for mass spectrometers. Typically the ions are produced at or near atmospheric pressure and are then directed into a vacuum chamber which houses the mass spectrometer. Typical ion sources are the well-known electrospray ion source, discussed for example in U.S. Pat. No. 4,842,701 to Smith et al., and the ion source referred to as ion spray, described in U.S. Pat. No. 4,935,624 to Henion et al. However a difficulty with conventional ion sources is that typically, $2\times10^{10}$ molecules of gas travel into the vacuum chamber with each ion admitted into the vacuum chamber. Costly and bulky pumps are required to remove the gas.

Attempts have been made in the past to attach the ions, after they have been created, to a surface and then to move the surface into the vacuum chamber. This would have various effects, including reducing the gas load entering the vacuum chamber. These attempts, which have used thin films and wires as carriers, have been batch type processes and have not been successful.

BRIEF DESCRIPTION OF PREFERRED EMBODIMENT

Accordingly, it is an object of the invention to provide an improved apparatus and method for introducing ions into a vacuum chamber using a carrier surface. As will be explained, the invention in one aspect involves spraying the ions onto the insulated surface of a spinning sharp-edged disk. The edge of the disk protrudes through a slot into the vacuum chamber, and the ions are removed at that location, for mass analysis.

Further objects and advantages of the invention will appear from the following description, taken together with the accompanying drawings.

DETAILED DESCRIPTION OF PREFERRED EMBODIMENTS

Figure 1:
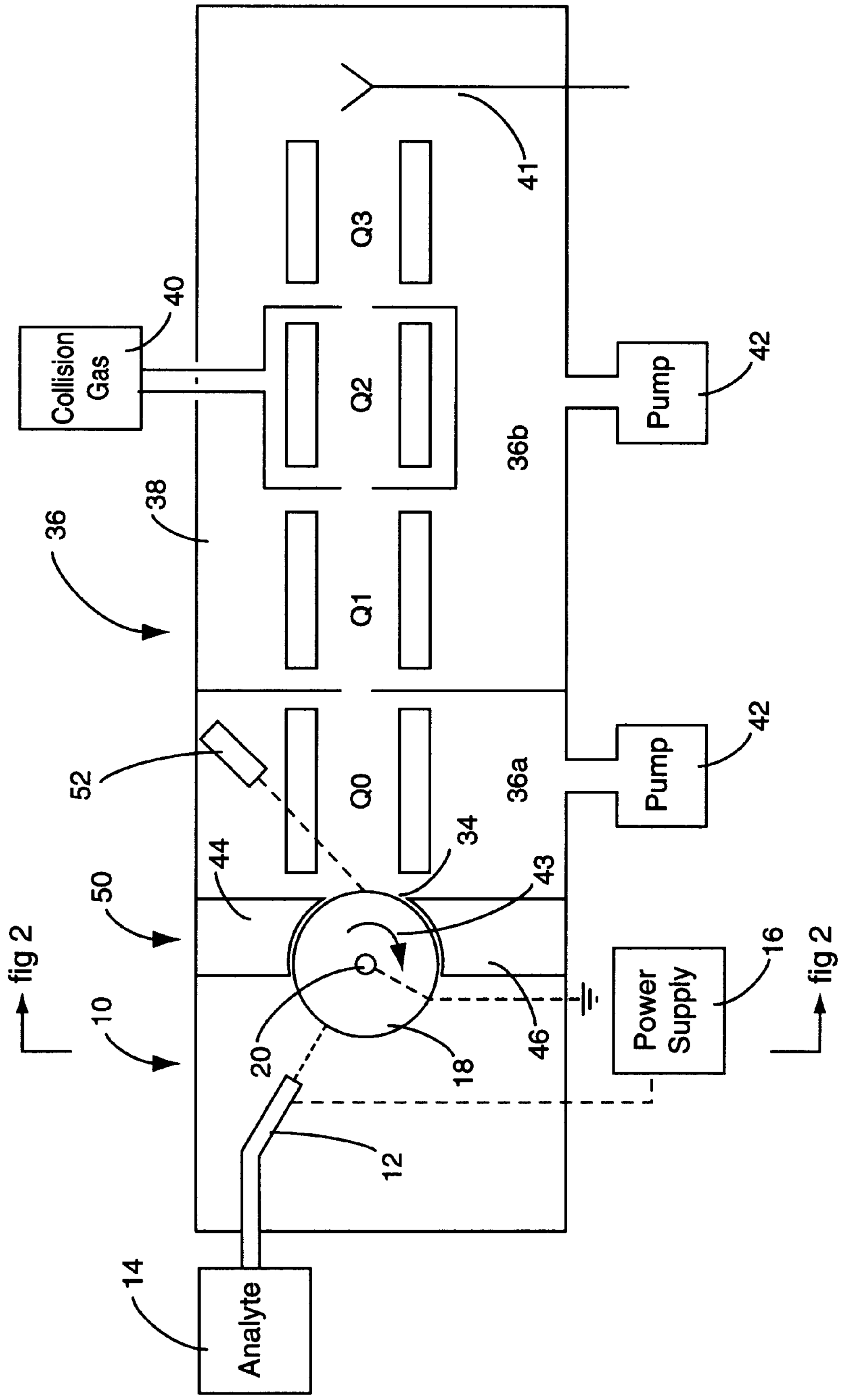
FIG. 1 is a diagrammatic sectional view of apparatus according to the invention.
Figure 2:
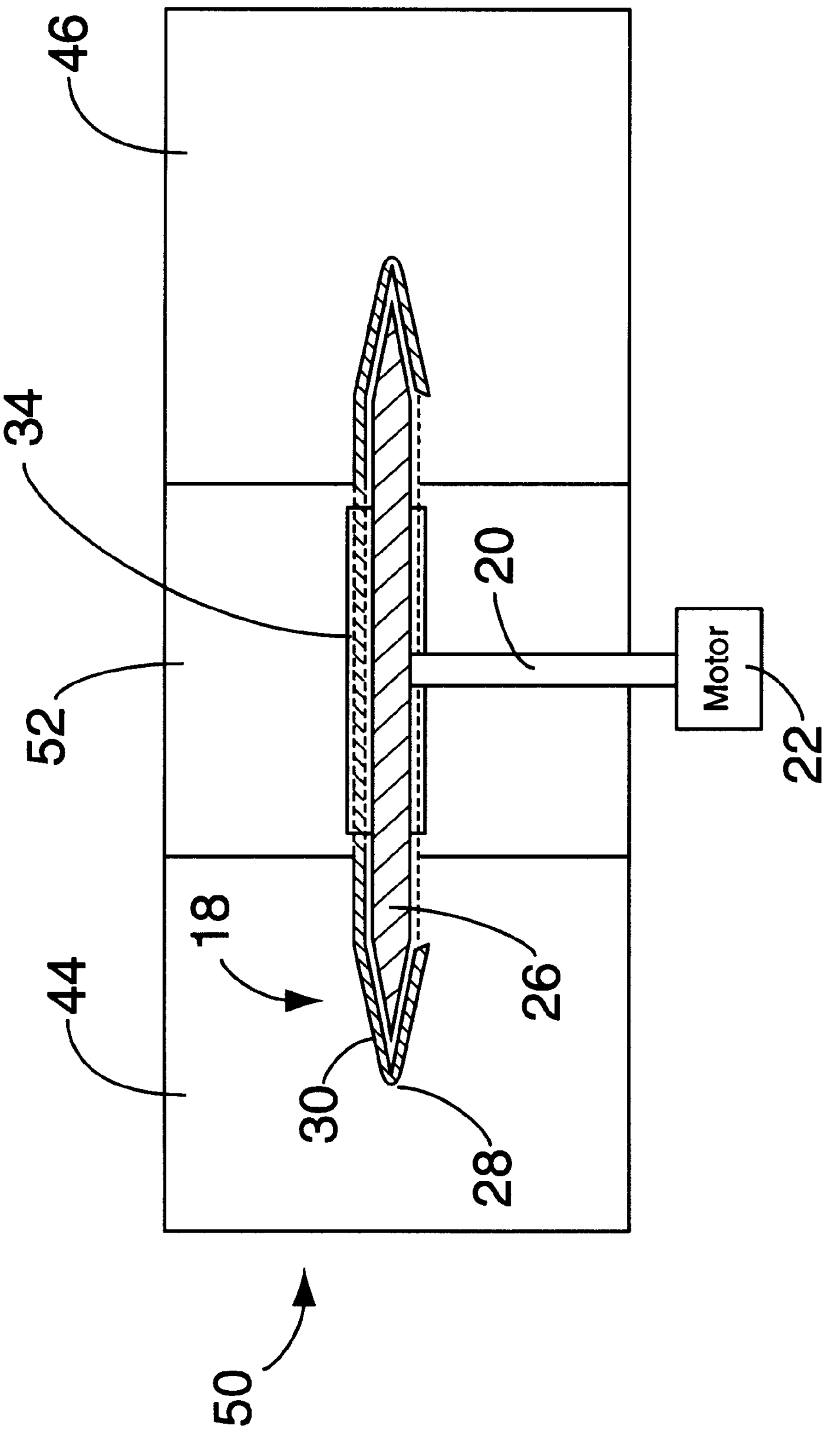
FIG. 2 is a sectional view taken along lines 2—2 of FIG. 1.

Reference is first made to FIGS. 1 and 2, which show an ion source chamber 10 held at or near atmospheric pressure.

Chamber 10 contains a conventional electrospray or ion spray capillary 12 (made according to either of the above mentioned two patents), which receives liquid analyte from an analyte source 14. (Other types of sources, e.g. atmospheric pressure chemical ionization sources, may also be used.) Analyte source 14 may be any appropriate source of liquid analyte, such as a small container of analyte, or eluent from a liquid chromatograph or capillary electrophoresis instrument. The capillary 12 is maintained at an appropriate high potential (e.g. +5 kV) from a conventional instrument power supply 16. For electrospray, the high voltage applied to the capillary 12 both pulls the liquid from the capillary to produce a cloud of droplets, and charges the droplets so that when they evaporate, ions will be formed. For ion spray (which uses a sheath flow nebulizing gas to pump the liquid and atomize the liquid into droplets), the high voltage charges the droplets so formed, again so that ions will be produced as the droplets evaporate.

The spray of droplets produced from capillary 10 is directed toward a sharp-edged disk 18, spinning about an axle 20 at any appropriate speed, e.g. in the range between 60 and 6,000 rpm. The diameter of disk 18 may vary, but is typically in the range one to three cm. Disk 18 is driven by motor 22.

The disk 18 has a conductive metal core 26 which preferably has a sharp-edged circular periphery. The sharp edge of core 26 is indicated at 28. An insulating layer 30 covers at least part of the disk surface, and in particular covers at least the sharp edge 28 of the disk and at least a limited portion (e.g. three mm) radially inwardly on each side of sharp edge 28.

The disk 18 is arranged so that a small portion of its sharp edge is located in a small slot 34 at the entrance to a vacuum chamber 36. Vacuum chamber 36 houses a mass spectrometer 38. The mass spectrometer 38 may be any kind of mass spectrometer, such as an ion trap, a time-of-flight mass spectrometer, a multipole (such as a quadrupole) mass spectrometer, or the like. By way of example, FIG. 1 depicts the quadrupole rods of a conventional tandem mass spectrometer of the kind which includes an entrance rod set Q0, a first resolving rod set Q1, a collision cell Q2 (supplied with collision gas from source 40), a daughter ion resolving rod set Q3, and a detector 41. The pressure in the entrance part 36*a* of vacuum chamber 36 may be (e.g.) $10^{-2}$ torr or lower, achieved by pump 42. The pressure in the remainder 36*b* of vacuum chamber 36 may be (e.g.) $10^{-5}$ torr or lower.

The disk insulating material 30 may be any type of robust insulating material which will retain ions, but which will not bind the ions, or some of the ions, with unduly high forces, since the ions are to be dislodged from the insulating material 30 (as will be described) and released into the vacuum chamber 36. The insulating layer or film 30 may be a thermoset polyester such as MYLAR (trade mark) or may be a material such as silicon dioxide, or may be a machinable ceramic (e.g. $AlO_3$) such as that sold under the trade mark MACOR, or any other suitable insulating material.

In use, analyte is sprayed from capillary 12 to form a cloud of droplets which evaporate to release ions, as is conventional. The ions are attracted to disk 18, since the metal core 26 of the disk is maintained at ground potential and serves as the counter electrode for the process. However since the metal core is covered (at its edge) with insulating layer 30, the ions (which are normally unipolar ions) are attracted to and remain on the surface of the insulating layer 30.

As indicated by arrow 43, the disk 18 is shown as being spun in a clockwise direction, carrying each segment of its surface first past a leading pole piece 44, then through slot 34 into the vacuum chamber 36, and then past a trailing pole piece 46. Preferably the leading pole piece 44 has (assuming that positive ions are being generated) a small positive voltage applied thereto, e.g. 0.1 kV, from power supply 16, to help keep the ions on the insulating surface 30 of the disk 18. Conversely, the trailing pole piece 46 has a substantial negative voltage applied thereto, e.g. −1 kV, from power supply 16, to help remove any ions which remain on the disk at that location after any such ions have been carried into and then out of the vacuum chamber 36. The pole pieces 44, 46 form part of the vacuum chamber end wall 50. The portion 52 of wall 50 between the pole pieces 44, 46 is insulated from pole pieces 44, 46 and contains the slot 34.

When the ions on the insulating surface 30 enter the vacuum chamber through slot 34, they may be removed by any desired means. These means may include the use of electrodes to create an electric field sufficiently strong to remove the ions from the insulating surface 30 of the disk, or a laser (indicated at 52) directed at the edge of the insulating surface which protrudes through slot 34, to energize the ions sufficiently to remove them, or bombardment by atoms, molecules or a selected species of ions, or any other desired means. A mono layer of liquid deposited on the disk surface may be helpful for efficient ion removal, since such a liquid layer will assist in absorbing laser energy.

When the ions are removed from the insulating layer 30 on the disk 18, it is preferred that this be done in a way such that the ions which have been removed will acquire as little energy as possible during the removal process. If the ions acquire too much energy, they may collide with background gas molecules in Q0 and fragment, and in addition they may acquire energy spreads which will require reduction before the ions are analyzed. One way to reduce the energy needed to remove the ions is to reduce the forces by which they are bound to the disk 18. An embodiment for accomplishing this is shown in FIGS. 3 and 4, in which primed reference numerals indicate parts corresponding to those of FIGS. 1 and 2.

Figure 3:
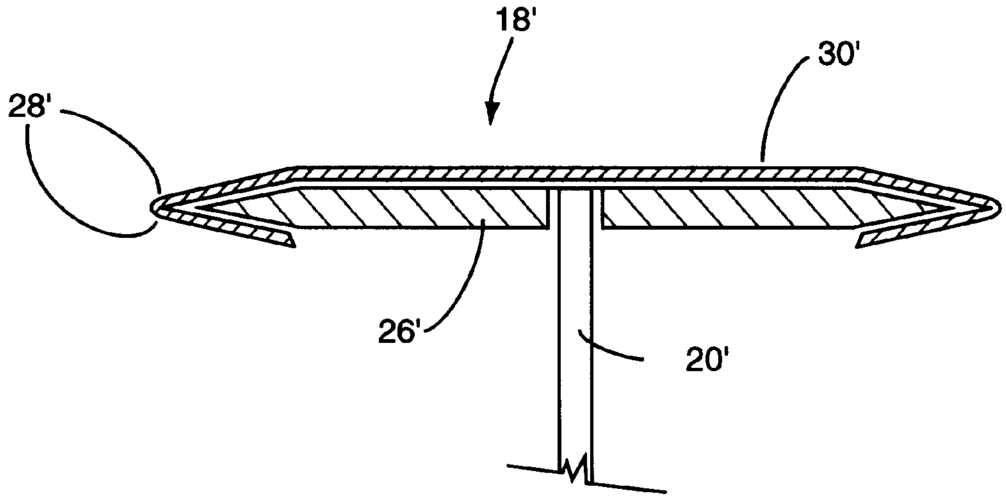
FIG. 3 is a sectional view of a modified disk of the invention.
Figure 4:
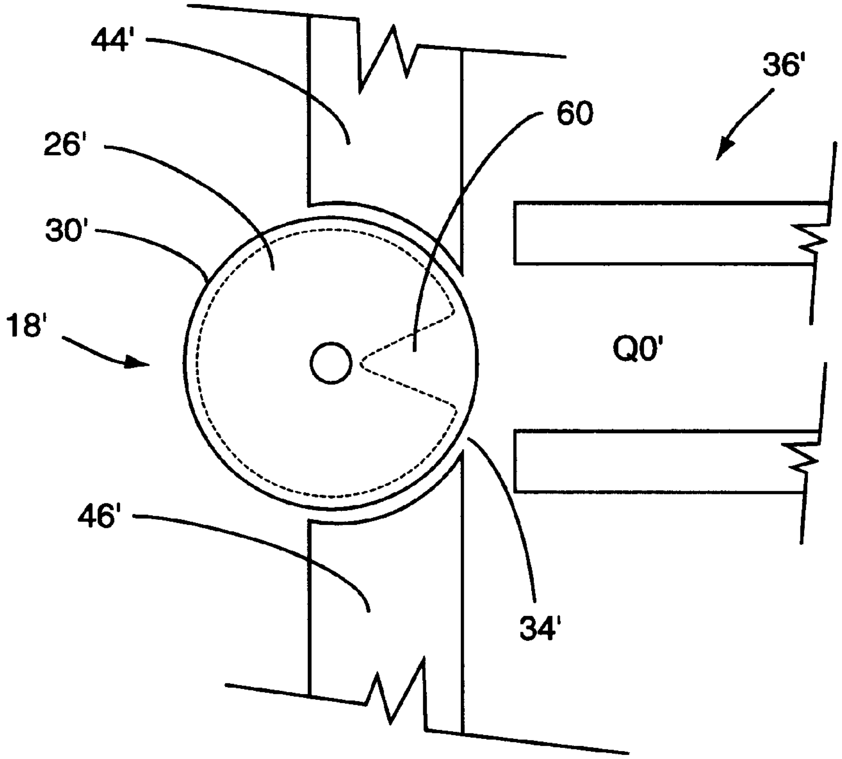
FIG. 4 is a plan view of a portion of the modified disk of FIG. 3.

In the FIGS. 3 and 4 embodiment, the disk 18' consists of a stationary metal core 26', and a thin insulating disk 30' connected to axle 20' and which spins over the metal core 26'. The edge 28' of the insulating layer 30' extends over the edge of the metal core 26' as before (but of course is not attached to the metal core).

As shown in FIG. 4, the metal core 26' has an opening or gap 60 at the location where the disk 18' enters (or is exposed to) the vacuum chamber 36'.

The FIGS. 3 and 4 embodiment takes advantage of the fact that when unipolar ions land on the disk 18', they form image charges in the metal of the disk below the insulating surface on which they land. The image charges help to retain the ions on the insulating surface 30'. However when the ions are carried by the spinning insulating surface over the opening 60, the image charges disappear (for so long as the ions are over a location which does not have any metal below it), reducing the forces required to release the ions from the disk 18'. Thus the ions can be transferred into the vacuum chamber 36' with lower absolute energy and with a lower energy spread.

Typically the clearance between the disk 18 or 18' and the walls of the slot 34 on each side of the disk are very small, e.g. 0.5 thousandths of an inch. These small clearances result in a much smaller gas load per ion entering the vacuum chamber than would be the case if the ions in a gas stream were allowed directly to enter the vacuum chamber.

Figure 5:
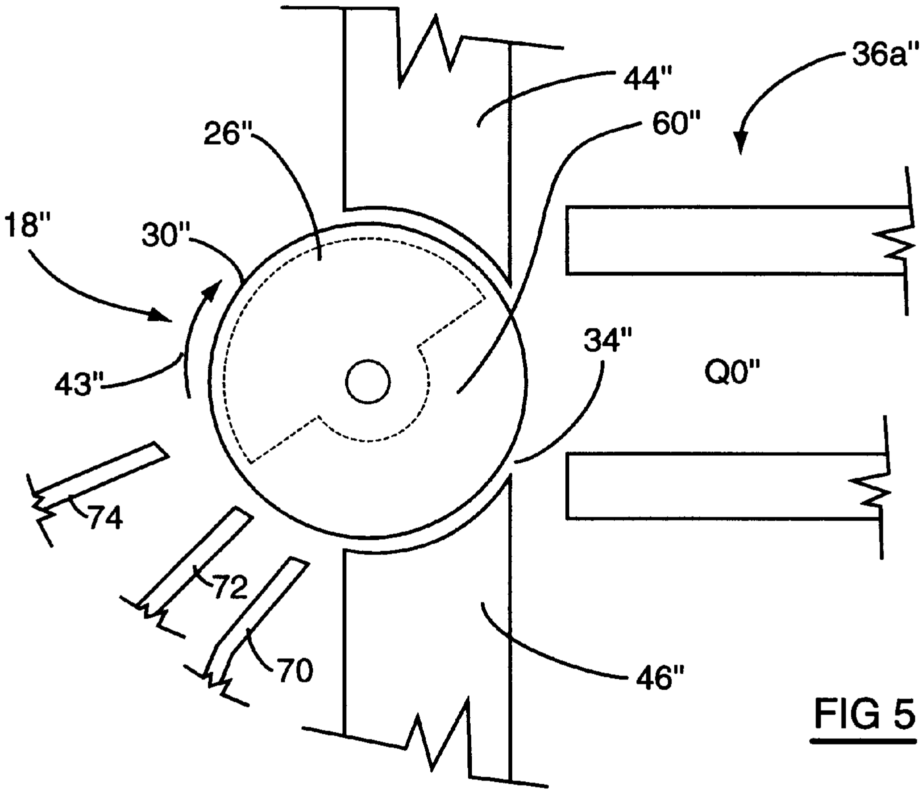
FIG. 5 is a plan view similar to FIG. 4 but showing a further modified disk.

Reference is next made to FIG. 5, which shows a disk similar to that of FIG. 4 and in which double primed reference numerals indicate parts corresponding to those of FIGS. 1 to 4. In the FIG. 5 disk 18", the metal core 26" has a gap 60" which is opened up to about 180°. This has been done to make it easier to remove unwanted ions from the disk surface by pole piece 46" (assuming clockwise rotation as indicated by arrow 43").

In addition, surface clean-up after the disk has rotated through the gap or slot 34", is facilitated by a hot water spray through tube 70 (using distilled deionised water). The water accomplishes ion neutralization, much as humid air prevents a build up of static charge. Other liquid, e.g. with a lower boiling point, heat capacitance, or chemical compatibility, can alternatively be used where appropriate.

Clockwise of tube 70, a second tube 72 discharges hot air on the disk surface to assist evaporation of any residual liquid from the disk surface. It is expected that the disk surface temperature will play a significant role in ion removal from the disk surface, as is the case for the well known process of field desorption.

FIG. 5 also shows another ion sprayer 74 (in addition to the sprayer 12, not shown in FIG. 5). Sprayer 74 may be used to spray reference mass ions on to the disk 18". This technique is useful for highly accurate work with a time of flight (TOF) mass spectrometer, where known reference masses are desirably included with the analyte masses of interest. While the reference masses could be included in the actual liquid in which the analyte masses are contained (i.e. in analyte from source 14), there exists a very real possibility of chemical interference between the two materials before spraying, if they were mixed, in addition to the difficulties of mixing the materials. In addition, in a batch process, adding reference masses to thousands of samples is a labour intensive nuisance. Sprayer 74 will typically deposit only a very small concentration of charge, so as not to interfere with analyte deposition.

Sprayer 74 can alternatively spray a material which will chemically react with the analyte on the disk surface, e.g. in positive/negative ion-ion reactions. This may be useful in some applications.

Figure 6:
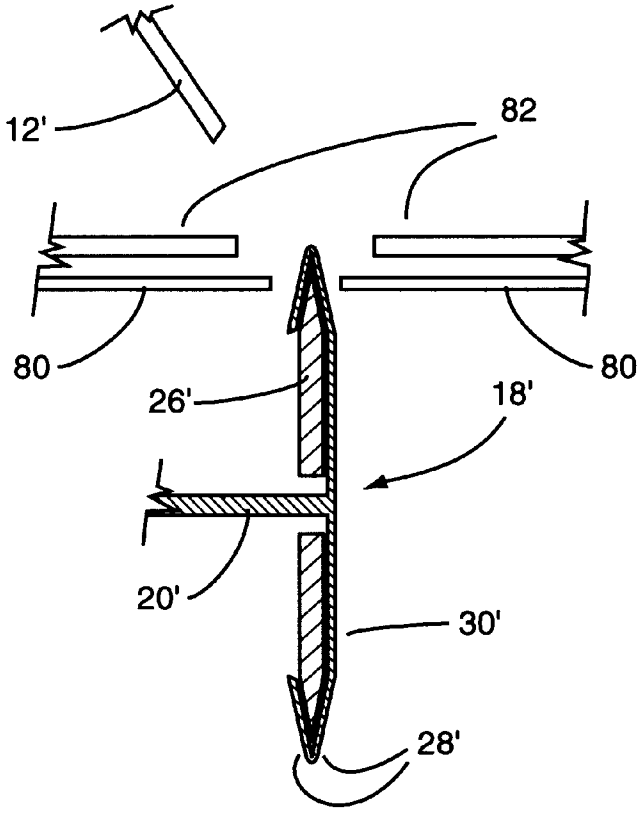
FIG. 6 is a sectional view of the disk of FIG. 5 showing focussing elements.

Reference is next made to FIG. 6, which show the same disk 18' as FIG. 3, but with the addition of focussing elements 80, 82 (more could be added with diminishing returns) which direct the electric field (which exists between sprayer 12' and disk 18') toward the tip of the metal disk 26'. Since atmospheric ions follow field lines, the focussing elements help to direct the ions toward the edge of the disk 18'. If desired, the focussing elements 80' could be made part of the pole piece 44" of FIG. 5.

Finally and with respect to removal of the ions from the insulating layer 30, 30' or 30", it is noted that ion extraction efficiency may be a function of ion mass, ion charge (e.g. charge state and polarity), and ion shape (tertiary structure and/or surface shape), as well as being composition dependent. It may be possible to exploit these dependencies to reduce chemical noise as it is presently experienced, e.g. if very small ions were bonded more securely than larger ions. In addition, if the disk insulating surface were able to discriminate between ions which are identical in every way except for three dimensional shape, then the discrimination technique would be biologically significant.

I claim:

1. Apparatus for transferring ions into a vacuum chamber for mass analysis, said apparatus comprising a source of vapour phase ions, a disk having an insulating surface and mounted for rotation about an axis, a motive device for spinning said disk, said disk being maintained at a potential to attract ions from the source to the disk, said vacuum chamber having a narrow slot therein, a portion of the periphery of the disk penetrating into said slot, and means for removing the ions on the disk at the location of said slot for thereby transferring the ions into the vacuum chamber.

2. Apparatus according to claim 1 wherein said disk has a metal core having an edge and an insulating surface covering at least said edge.

3. Apparatus according to claim 2 wherein said metal core is fixed and has a gap therein adjacent said slot, and said insulating surface is mounted for rotation over said core, whereby to reduce image charges at the location of said slot.

* * * * *